HIDEO MITSUNO.
*INVENTOR.*

March 17, 1970  HIDEO MITSUNO  3,500,548
DETECTING AND MEASURING APPARATUS FOR GLASS RIBBON
Filed Nov. 13, 1967  3 Sheets-Sheet 2

HIDEO MITSUNO,
INVENTOR.

HIDEO MITSUNO,
INVENTOR.

BY Wenderoth, Lind &
Ponack. Attys.

United States Patent Office 3,500,548
Patented Mar. 17, 1970

3,500,548
DETECTING AND MEASURING APPARATUS
FOR GLASS RIBBON
Hideo Mitsuno, Maizuru-shi, Japan, assignor to Nippon
Sheet Glass Co., Ltd., Osaka, Japan
Filed Nov. 13, 1967, Ser. No. 682,037
Claims priority, application Japan, Nov. 17, 1966,
41/75,679, 41/75,680
Int. Cl. G01b 7/16
U.S. Cl. 33—174                                    8 Claims

ABSTRACT OF THE DISCLOSURE

Position of a side edge of a glass ribbon advancing on a molten metal bath is detected electrically by an apparatus wherein at least one electrode is suspended in such a manner that when the ribbon passes the position of the electrode, it contacts the electrode at its upper surface, and there is provided a power source with one pole connected to the electrode and other pole to the metal bath. Change in electric current shows that the glass passes that position of the electrode. A width of the ribbon is determined by checking the positions of both side edges of the ribbon.

BACKGROUND OF THE INVENTION

This invention relates to an apparatus for detecting the position of a side edge portion of a ribbon-like glass travelling on a molten metal bath, and also to an apparatus for measuring the width of a ribbon-like glass travelling on a molten metal bath.

FIELD OF THE INVENTION

In a continous manufacture of a flat glass comprising the steps of feeding a molten glass from a glass melting furnace onto a molten metal bath, forming a layer of the molten glass on the molten metal bath, and making it into a ribbon-like glass while advancing it along the molten metal bath, the layer of the molten glass fed onto the molten metal bath is equilibrated to a given thickness (may sometimes be called an equilibrium thickness), depending upon the weight and viscosity of the glass itself, the surface tension between the glass and the molten metal, the surface tension between the glass and atmospheric gas within the molten metal bath, and the pulling force exerted on the glass. Accordingly, if the above-mentioned conditions are constant, it is possible to continuously produce a ribbon-like glass having a predetermined width and thickness, unless an amount of a molten glass to be fed into a molten metal bath and an amount of a ribbon-like glass to be withdrawn from the molten metal bath are varied. When there is a change in an amount of a molten glass to be fed into a molten metal bath and/or an amount of a ribbon-like glass to be withdrawn from a molten metal bath, unless the above-mentioned conditions are varied, there is no change in the thickness of the glass; but the position of a side edge portion of a glass ribbon and the width of the glass ribbon at a given point along the longitudinal direction of the bath are changed. It often becomes necessary by reason of operational control to measure the width of a glass ribbon on a bath which has attained an equilibrium thickness. The measurement of the width of a glass ribbon can be readily made at a place where the glass is solidified and transported by a conveyor roll, but it is not to so easy to measure the width of a glass ribbon moving on a molten metal bath. When an amount of a molten glass fed into a molten metal bath is extraordinarily increased or an amount of a ribbon-like glass withdrawn from the molten metal bath is extraordinarily decreased, an amount of the glass having a high temperature becomes excessive, and a side edge of the glass ribbon before attaining an equilibrium thickness projects outwards, with the result that the molten glass sticks to a refractory material on the side wall of the molten metal bath or corrodes the refractory material. It will be obvious that such an emergency occurs at a place in the vicinity of an outlet of the glass melting furnace. The position of the side edge of the glass ribbon can readily be detected at a place where the glass is solidified and transported by the conveyor roll, but there is too much delay in knowing such emergency because that place is spaced far from the outlet of the glass melting furnace. It often becomes necessary therefore for the sake of safe operation to detect the position of the side edge portion of the glass ribbon on the bath at a place near the outlet of the glass melting furnace.

OBJECTS OF THE INVENTION

One of the general objects of the present invention is to provide an apparatus for the detection of the position of a side edge portion, or for the measurement of the width, of a ribbon-like glass on a molten metal bath. A particular object of this invention is to provide an apparatus for measuring the width of a ribbon-like glass advancing on a molten metal bath in its longitudinal direction at a place where the glass is substantially non-conductive. Another particular object of this invention is to provide an apparatus for detecting the position of a side edge portion of a ribbon-like glass advancing on a molten metal bath at a place where the glass is still electro-conductive. Still another object of this invention is to provide an apparatus for detecting as an electric signal the width of a ribbon-like glass on a molten metal bath or the position of its side edge portion, and sending the signal to an alarm device or a tweel actuating means at a molten glass feed inlet whereby the occurrence of an emergency can be prevented.

SUMMARY OF THE INVENTION

The present invention provides an apparatus for detecting the position of a side edge portion of a ribbon-like glass advancing on a molten metal bath, which comprises at least one electrode located at a predetermined position in a direction transverse to the molten metal bath and suspended from a supporting member so that a glass ribbon may advance on the bath while being in contact with the electrode when the glass ribbon passes that position, a power source having one pole electrically connected to the said electrode and other pole electrically connected to the molten metal, and at least one current detecting means. Glass, which is fed onto the molten metal bath, expanded there, and advances on it in the form of a continuous ribbon, is electro-conductive at an early stage because of high temperature, but becomes substantially non-conductive by gradual cooling. In the apparatus for detecting the position of a side edge portion of a ribbon-like glass advancing on a molten metal bath at a place where the glass is still electro-conductive, each electrode is above the molten metal without being in contact with it, and is suspended from a supporting member so that the glass ribbon may advance on the bath while being in contact with the electrode when it passes the position of the electrode. In other words, unless each electrode is contacted with the glass ribbon, an electric current does not flow in it, but when it is contacted with the glass ribbon (that is to say, when a side edge portion projects to a position of the electrode), an electric current flows through the electrode, electro-conductive glass and molten metal. The electric current or a total of the electric currents is detected or measured by the current detecting means.

A lead wire from the suspension electrode is connected to one pole of the power source (for instance, the positive pole) through a magnetic coil of a relay for actuating a motor to move up and down a tweel at a molten glass feed inlet and an alarm deice, and a lead wire from the electrode connected to the molten metal is connected to the other pole (for instance, the negatie pole). When there are two suspension electrodes, a lead wire from a suspension electrode situated more inside the molten metal bath is connected to one pole of the power source (for instance, the positive pole) through an electromegnetic coil of a relay for actuating an alarm device, and a lead wire from the other suspension electrode is connected to the pole (positive pole) of the said power source through a magnetic coil of a relay for actuating the said motor. A lead wire from an electrode connected to the molten metal is connected to the other pole (negative pole) of the said power source.

Let us suppose, for instance, that an amount of a molten glass to be fed into a molten metal bath from a glass melting furnace is abruptly increased for some reason. Under the circumstances, a ribbon-like glass is abnormally expanded with its side edges being projected, and flows between the molten metal and the suspension electrodes, whereby the suspension electrodes become electrically connected to the electrode connected to the molten metal. Then, an electric current flows in the said circuit to actuate the relay which gives an alarm and warns of an unusual situation. Or the said motor is rotated to let a tweel at the molten glass feed inlet go down and thus stop the feeding of the molten glass, whereby it is possible to prevent the sticking of the molten glass to the refractory material or the corrosion of the refractory material.

On the other hand, in the apparatus for detecting the position of a side edge portion of a ribbon-like glass advancing on a molten metal bath at a place where the glass is substantially non-conductive, each electrode is suspended from a supporting member so that it will be in contact with the molten metal unless the glass ribbon reaches the position of the electrode, but when the glass ribbon passes the position of the electrode, the glass ribbon will advance over the bath while being in contact with the electrode. In other words, unless the electrode is contacted with the glass ribbon, an electric current flows through the electrode and molten metal, but when it contacts the glass ribbon (that is to say, when the electrode suspended from the supporting member is lifted by the glass ribbon passing the position of the electrode), the contact between the electrode and the molten metal is interrupted by the glass ribbon which is substantially non-conductive, and the value of the current changes. The change of the current or a total of the currents is detected or measured by the current detecting means.

If the above device for the detection of the position of a side edge portion of a glass ribbon is provided on both sides of the glass ribbon, it is possible to measure the width of the glass ribbon. Accordingly, this invention further provides an apparatus for measuring the width of a ribbon-like glass advancing on a molten metal bath, which comprises a pair of opposing detecting means each of which is adapted to detect the position of each side edge portion of the said ribbon-like glass and consists of a supporting member and at least one electrode, the said electrode being situated at a predetermined position in a direction transverse to the molten metal bath and being suspended from the supporting member so that the glass ribbon may advance on the bath while being in contact with the electrode when the glass ribbon passes that position, a power source having one pole electrically connected to each electrode of the said detecting means and the other pole electrically connected to the molten metal, and a means for measuring a total electric current. In the apparatus for measuring the width of a ribbon-like glass advancing on a molten metal bath at a place where the glass is substantially non-conductive, each electrode is suspended from a supporting member so that it will be in contact with the molten metal unless the glass ribbon reaches the position of the electrode (that is, a portion of each electrode is immersed in the bath), but when the glass ribbon passes the position of the electrode, the glass ribbon will advance on the bath while being in contact with the electrode whereby the contact between the electrode and the molten metal can be interrupted. In other words, each electrode is so designed that unless its contacts the glass ribbon an electric current flows through the electrode and the molten metal, but when it contacts the glass ribbon (that is to say, the electrode suspended from the supporting member is lifted by the glass ribbon passing the position of the electrode), the said contact between the electrode and the molten metal is interrupted by the glass ribbon which is substantially non-conductive, with the result that the electric current changes. A total value of the electric currents flowing in all the electrodes is detected or measured by the current detecting means.

A lead wire from said suspension electrode is connected to one pole (for instance, the positive pole) of the said power source through a resistance, and a lead wire from the electrode connected to the molten metal is connected to the other pole (negative pole) of the power source through an ammeter, whereby an electric circuit is formed. If the side edge of a ribbon-like glass is positioned inside the position of the suspension electrode, an electrode connected to the molten metal becomes electrically connected to the suspension electrode through the molten metal, and an electric current flows in the circuit. The value of the current is indicated by the ammeter. When the side edge of the ribbon-like glass is outside the position of the suspension electrode, the ribbon-like glass having a relatively low temperature pushes up the suspension electrode, and there is a remarkably high electric resistance between the suspension electrodes and the electrode connected to the molten metal. At this time, there is hardly any electric current flowing in the circuit, and the ammeter indicates zero. Thus, by providing one or more suspension electrodes at predetermined positions and by connecting lead wires drawn outside the molten metal bath from the suspension electrodes to the pole (positive pole) of the power source through resistances, it is possible to measure the position of the side edge of the ribbon-like glass from the values indicated by the ammeter of the circuit. The provision of such suspension electrods on both sides of a molten metal bath makes it possible to measure the width of a ribbon-like glass easily.

Furthermore, by controlling the tweel actuating motor at a molten glass feed inlet by the change in the current of the circuit, an amount of the molten glass to be fed into the molten metal bath can be controlled, and therefore, the width of the ribbon-like glass can automatically be maintained constant.

On the other hand, in the apparatus for detecting the position of the side edge portion of a ribbon-like glass advancing on a molten metal bath at a place where the glass is still electro-conductive, each electrode is above the molten metal without contacting it, and is suspended from a supporting member so that when the glass ribbon passes the position of the electrode, it will advance on the bath while being in contact with the electrode. To put it the other way round, each electrode is so designed that unless it comes into contact with the glass ribbon, an electric current does not flow in the electrode, but when it contatcs the glass ribbon (that is to say, the side edge portion of the glass ribbon projects to the position of the electrode), a certain amount of electric current may flow through the electrode, electro-conductive glass, and molten metal. A total of such electric currents is measured.

BRIEF DESCRIPTION OF THE DRAWINGS

Illustrative embodiments of the invention will now be described with reference to the accompanying drawings in which.

DESCRIPTION OF PREFERRED EMBODIMENTS

Figure 1:
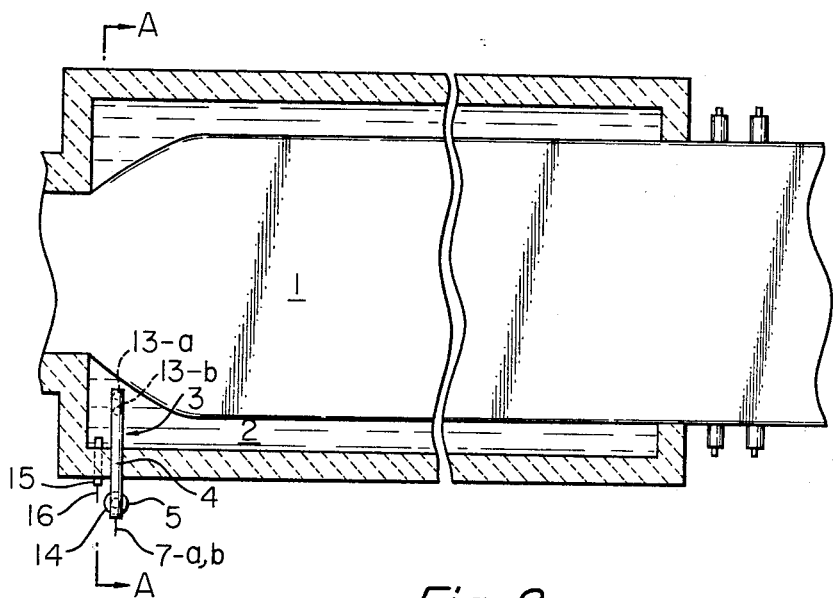
FIG. 1 is a diagrammatic plan view of a molten metal bath provided with the apparatus of the invention for detecting the position of a side edge portion of a ribbon-like glass advancing on the molten metal bath at a place where the glass is still electro-conductive.
Figure 2:
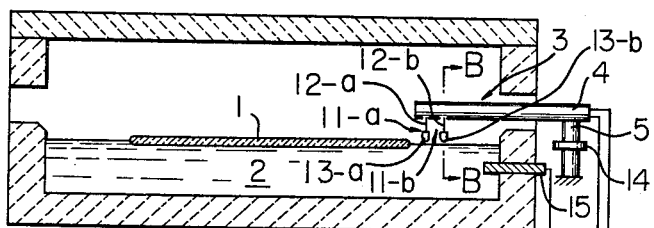
FIG. 2 is a diagrammatic sectional view along the line A—A of FIG. 1 which additionally shows an electric connection.
Figure 3:
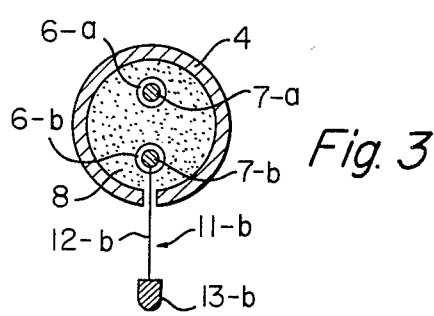
FIG. 3 is an enlarged view of the detecting means of the apparatus of the invention along the line B—B of FIG. 2.

In FIGS. 1, 2 and 3, the reference numeral 1 represents a ribbon-like glass formed on a molten metal bath 2. Shown by reference numeral 3 is a detecting means of the invention provided on the molten metal bath near a molten glass feed inlet which has an arm 4 inserted from the side wall of the molten metal bath. The arm 4 is usually a stainless steel pipe, and supported by a supporter 5 outside the molten metal bath. The arm 4 has lead wires 7–a and 7–b covered with insulation coverings 6–a and 6–b respectively. The insulation coverings are embedded in mortar 8 so that they will not move within the arm 4. The lead wires 7–a and 7–b are usually made of copper wire, copper band, Nichrome wire or Nichrome band. The lead wires 7–a and 7–b drawn outside the molten metal bath are connected to the positive pole of a power source 10 through a magnetic coil of relays 9–a and 9–b respectively. Suspension electrodes 11–a and 11–b each contain electrodes 13–a and 13–b suspended from the arm 4 by means of suspending metal wires 12–a and 12–b respectively. One end of each of the metal wires 12–a and 12–b are connected to the lead wires 7–a and 7–b respectively with a space between them. The metal wires are usually of copper wire, copper band, heat-resistant Nichrome wire or Nichrome band. The electrodes 13–a and 13–b are preferably made of such material as graphite which is not wet by the molten glass, and are controlled by a screw 14 for the height adjustment of arm 4 on the supporter 5 so that they will be situated below the level of the equilibrium thickness of a glass layer but will not contact the molten metal. The length of the arm 4 is so determined that the position of the suspension electrode 11–a is outside the position of the side edge of glass on the molten metal bath in a normal operation condition. The reference numeral 15 shows an electrode connected to the molten metal and inserted in the molten metal bath from the side wall, which is connected to a lead wire 16. One end of the lead wire 16 is connected to the negative pole of the power source 10. To the relays 9–a and 9–b are connected an alarm device 17 and a control device 18 for the motor 19, respectively. The motor 19 is connected to a tweel (not shown) at a glass feed inlet.

For instance, when an amount of a molten glass to be fed from a glass melting furnace is increased or an amount of ribbon-like glass from the bath is decreased owing to the disorder of conveyor, the side edge of the ribbon-like glass on the molten metal bath 2 projects, and the molten glass flows between the electrode 13–a and the molten metal. Thus, the glass is in contact with the electrode 13–a, and the suspension electrode 11–a becomes electrically connected to the electrode 15 connected to the molten metal at a low resistance through the molten glass and molten metal, whereby a prescribed current flows in a magnetic coil of the relay 9–a, and the alarm device 17 gives an alarm by the operation of the relay 9–a, and indicates the existence of an unusual situation. Thus, proper action can be taken before an accident occurs. If it should happen that a side edge of the ribbon-like glass projects at an earlier stage, the position of the side edge reaches the suspension electrode 11–b before the above action is taken, and the suspension electrode 11–b becomes electrically connected to the electrode 15 connected to the molten metal at a low resistance. Thus, a prescribed current flows in a magnetic coil of the relay 9–b, and the relay 9–b is operated. The motor 19 is operated by the control device 18, and the tweel at the glass feed inlet is closed to thereby stop the supply of molten glass.

Figure 4:
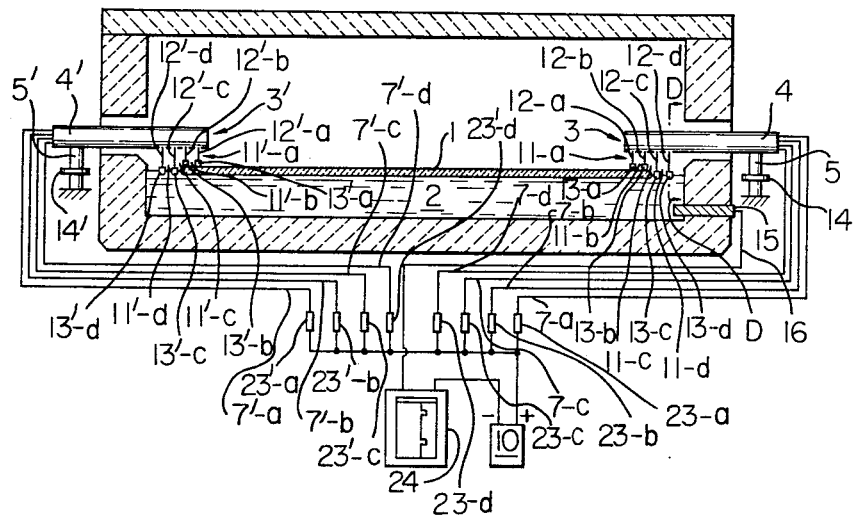
FIG. 4 is a diagrammatic sectional view of a molten metal bath provided with the apparatus of the invention for measuring the width of a ribbon-like glass advancing on the molten metal bath at a place where the glass is substantially non-conductive, which additionally shows an electric connection.
Figure 5:
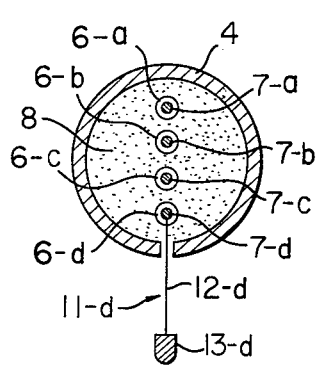
FIG. 5 is an enlarged sectional view of the detecting means of the apparatus of the invention along the line C—C of FIG. 4.

In FIGS. 4 and 5, the reference numeral 1 designates a ribbon-like glass formed on a molten metal bath 2. The numerals 3 and 3' represent the detecting devices of the present invention provided on both sides of the molten bath, which have arms 4 and 4' inserted from both side walls of the molten metal bath. The arms 4 and 4' are usually of stainless steel pipe, and are supported respectively by supporters 5 and 5'. The arm 4 of the detecting device 3 has lead wires 7–a, 7–b, 7–c and 7–d covered respectively with insulation coverings 6a, 6–b, 6–c and 6–d. The insulation coverings 6 are embedded in mortar 8 so that they will not move in the arm 4. The lead wires 7–a, 7–b, 7–c and 7–d are usually made of copper wire, copper band, Nichrome wire, or Nichrome band. The lead wires 7–a, 7–b, 7–c and 7–d are connected to the positive pole of the power source 10 through resistances 23–a, 23–b, 23–c and 23–d respectively.

Suspension electrodes 11–a, 11–b, 11–c and 11–d contain electrodes 13–a, 13–b, 13–c and 13–d respectively suspended from the arm 4 by metal wires 12–a, 12–b, 12–c and 12–d respectively. One end of each of the metal wires 12–a, 12–b, 12–c and 12–d is connected to the lead wires 7–a, 7–b, 7–c and 7–d respectively with a certain space between them. The metal wires 12–a, 12–b, 12–c and 12–d are usually of copper wire, copper band, heat-resistant Nichrome wire, or Nichrome band. The electrodes 13–a, 13–b, 13–c and 13–d are made, for instance, of graphite around which the molten glass is slidable, and are controlled by a screw 14 provided on the supporter 5 for height adjustment of the arm 4 so that a portion of the electrodes can be immersed in the molten metal bath 2.

Lead wires 7'–a, 7'–b, 7'–c and 7'–d drawn outside the molten metal bath from electrodes 13'–a, 13'–b, 13'–c and 13'–d and metal wires 12'–a, 12'–b, 12'–c and 12'–d are connected to the positive pole of the power source through resistances 23'–a, 23'–b, 23'–c and 23'–d respectively. The said metal wires 12'–a, 12'–b, 12'–c and 12'–d and the lead wires 7'–a, 7–b, 7'–c and 7'–d are usually made of copper wire, copper band, Nichrome wire or nichrome band. Shown by the reference numeral 15 is an electrode inserted in the molten metal bath from the side wall of the molten metal bath 2 and connected to the molten metal bath, and which is connected to a lead wire 16. One end of the lead wire 16 is connected to a negative pole of the power source 10 through a width meter 24 which is a recording ammeter.

Figure 6:
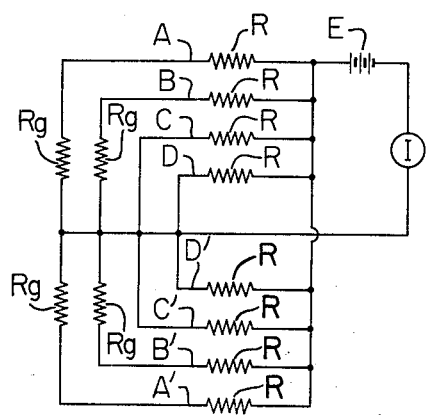
FIG. 6 is an equivalent circuit diagram of the electric circuit shown in FIG. 4.

FIG. 6 shows an equivalent circuit of the electric circuit of the present apparatus when both side edges of a ribbon-like glass are between suspension electrodes 11–b and 11–c, and 11'–b and 11'–c. In FIG. 6 Rg is a value of resistance between the molten metal and each suspension electrode when the ribbon-like glass is disposed between them. The value of resistances 23–a, 23–b, 23–c and 23–d and 23'–a, 23'–b, 23'–c and 23'–d is R. E is an electromotive force, and I is a value of the current flowing in the width meter 24. A, B, C, D and A', B', C', D' represent electric circuits corresponding respectively to suspension electrodes 11–a, 11–b, 11–c, 11–d, and 11'–a, 11'–b, 11'–c, 11'–d. The resistances of the molten metal (tin) and the lead wires 7–a, 7–b, 7–c, 7–d, 7'–a, 7'–b, 7'–c, 7'–d and 16, and suspension electrodes 11–a, 11–b, 11–c, 11–d, 11'–a, 11'–b, 11'–c and 11'–d is negligible as compared with R and Rg, and Rg is extremely large as compared with R. Since current flowing in circuits A and B, and A' and B' is $E/(Rg+R)$, and the current flowing in circuits C and D, and C' and D' is $E/R$, the current I flowing in the width meter 24 is expressed by the following equation:

$$\frac{4E}{Rg+R} + \frac{4E}{R} \doteq \frac{4E}{R}$$

When both side edges of the ribbon-like glass are respectively between the suspension electrodes 11–a and 11–b, and between the suspension electrodes 11'–a and 11'–b the electrodes 13–a and 13'–a are lifted onto the ribbon-like glass. Thus, the current I flowing in the width meter 24 is $6E/R$ by the same calculation. Furthermore, when both side edges of the ribbon-like glass are between the suspension electrodes 11–c and 11–d, and between the suspension electrodes 11'–c and 11'–d, the electrodes 13–a, 13–b, 13–c and 13'–a, 13'–b, 13'–c are lifted onto the ribbon-like glass 1. Hence, the current I flowing in the width meter 24 is $2E/R$. If the positions of the suspension electrodes 11–a, 11–b, 11–c, 11–d, 11'–a, 11'–b, 11'–c and 11'–d are predetermined, the width of the ribbon-like glass 1 can be known from the indicated value of the current on the width meter 24. If a motor is connected to the width meter 24 through a motor controlling device (not shown) and the tweel at the glass feed inlet is moved up and down by the operation of the motor on the basis of the change in current flowing in the width meter, it is possible to control the amount of the molten glass to be fed, and automatically maintain the width of the ribbon-like glass consant.

Figure 7:
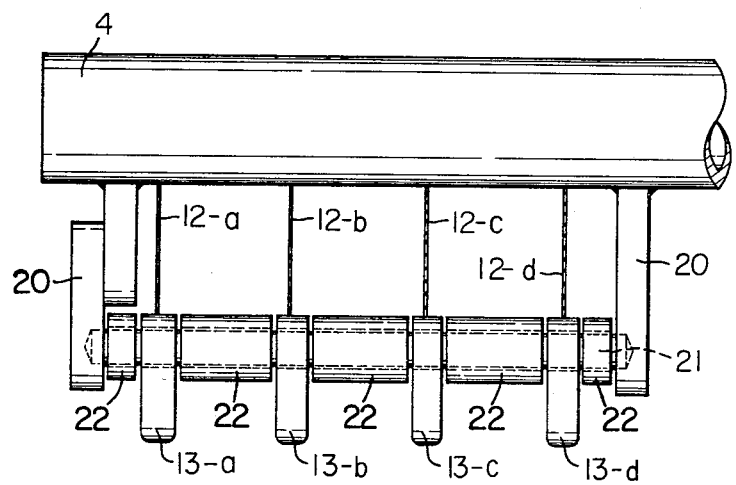
FIG. 7 is a front view for illustrating a series of preferable electrodes usable in the apparatus of the invention; and, FIG. 8 is a side view of FIG. 7.
Figure 8:
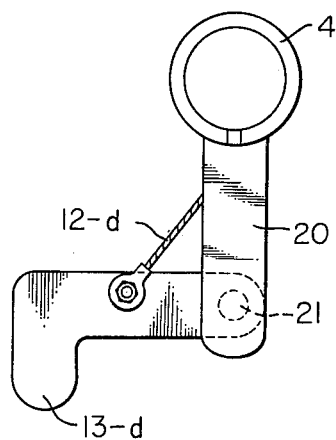

One example of a preferred suspension electrode used in the apparatus of the invention is shown in FIGS. 7 and 8. The arm 4 consists of a stainless steel pipe, in which insulation tubes 6–a, 6–b, 6–c and 6–d (not shown) containing lead wires 7–a, 7–b, 7–c and 7–d (not shown) respectively are embedded in mortar 8. The arm 4 has a pair of hanging pieces 20 secured to it and extending downwardly, and the pair of hanging pieces 20 support a shaft 21 consisting of an insulation material. L-shaped electrodes 13–a, 13–b, 13–c and 13–d are mounted on the shaft 21 so that they are rotatable around the shaft 21 and are separated by separators 22 made of an insulation material to space the electrodes at specified intervals. The electrodes 13–a, 13–b, 13–c and 13–d consist of a material such as graphite which is not wet by molten glass, and are suspended from the arm 4 by means of the suspending metal wires 12–a, 12–b, 12–c, and 12–d each connected to one end of leads wires 7–a, 7–b, 7–c and 7–d. The suspending metal wires are stretched tight by the weight of the electrodes. The electrode of this type is preferable in that it does not move in transverse directions during use, and only a part of the weight of the electrode as exerted on a glass ribbon.

I claim:

1. An apparatus for detecting the position of a side edge portion of a ribbon-like member of glass advancing on a molten metal bath by detecting the presence or absence of the glass, comprising at least one detecting electrode disposed in proximity to at least one side edge portion of said ribbon-like member of glass, a further electrode contacting the molten bath, a power source having one pole electrically connected to said detecting electrode and the other pole electrically connected to said further electrode, and current sensing means coupled with said electrodes and said power source for detecting changes in the electric current flowing between said power source and said electrodes, said detecting electrode being disposed at a predetermined position in a direction transverse to said molten metal bath; whereby when said glass does not pass between said detecting electrode and the molten bath at said position, the current flow has one value, and when the glass passes between said detecting electrode and said position, the detecting electrode contacts the upper surface of the glass and the current flow has a different value, the difference in the current flows indicating the presence or absence of glass and sensing whether the glass is at said position or not.

2. The apparatus as claimed in claim 1 in which said detecting electrode is suspended at said position so that it is spaced from the surface of the molten bath a distance less than the thickness of the glass, and said position is at a point where the glass is electro-conductive, whereby when the glass does not flow between the detecting electrode the circuit from the power source through the molten bath to the detecting electrode is broken and when glass does pass between the detecting electrode and the molten bath the circuit is completed.

3. The apparatus as claimed in claim 1 in which said detecting electrode is suspended at said position so that it contacts the molten bath and is free to move upwardly, whereby when the glass does not flow between the detecting electrode and the circuit from the power source through the molten bath to the detecting electrode is completed, and when the glass does pass between the detecting electrode and the molten bath, the circuit is broken.

4. The apparatus as claimed in claim 1 in which there are a plurality of detecting electrodes connected in parallel to said power source and spaced in the direction of the width of the ribbon-like member of glass.

5. An apparatus for detecting the position of a side edge portion of a ribbon-like member of glass advancing on a molten metal bath by detecting the presence or absence of the glass, comprising at least one detecting electrode disposed in proximity to each side edge portion of said ribbon-like member of glass at positions on opposite sides of said ribbon-like member of glass, a further electrode contacting the molten bath, a power source having one pole electrically connected to said detecting electrodes and the other pole electrically connected to said further electrode, and current sensing means coupled with said electrodes and said power source for detecting changes in the electric current flowing between said power source and said electrodes, said detecting electrodes being disposed at predetermined positions in a direction transverse to said molten metal bath; whereby when said glass does not pass between said detecting electrodes and the molten bath at said positions, the current flow has one value, and when the glass passes between either of said detecting electrodes and said positions, the detecting electrode contacts the upper surface of the glass and the current flow has a different value, the difference in the current flows indicating the presence or absence of glass and sensing whether the glass is at said positions or not.

6. The apparatus as claimed in claim 5 in which said detecting electrodes are suspended at said positions so that they are spaced from the surface of the molten bath a distance less than the thickness of the glass, and said positions are at a point where the glass is electro-conductive, whereby when the glass does not flow between the detecting electrodes the circuit from the power source through the molten bath to the detecting electrodes is broken and when glass does pass between one of the detecting electrodes and the molten bath the circuit is completed.

7. The apparatus as claimed in claim 5 in which said detecting electrodes are suspended at said positions so that they contact the molten bath and are free to move upwardly, whereby when the glass does not flow between the detecting electrodes the circuit from the power source through the molten bath to the detecting electrodes is completed, and when the glass does pass between the detecting electrodes and the molten bath, the circuit is broken.

8. The apparatus as claimed in claim 5 in which there are a plurality of detecting electrodes at each position connected in parallel to said power source and spaced in the direction of the width of the ribbon-like member of glass.

References Cited

UNITED STATES PATENTS

| | | | |
|---|---|---|---|
| 3,305,853 | 2/1967 | Insolio et al. | |
| 3,445,214 | 5/1969 | Ormesher. | |
| 3,278,838 | 10/1966 | Behr | 324—34 |
| 3,218,066 | 11/1965 | Halberschmidt | 271—57 |
| 2,848,815 | 8/1958 | Scheu | 33—143 |

SAMUEL S. MATTHEWS, Primary Examiner

U.S. Cl. X.R.

65—158